United States Patent
Ito (10) Patent No.: US 9,960,459 B2
(45) Date of Patent: May 1, 2018

(54) METHOD OF MANUFACTURING NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Yuichi Ito, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 179 days.

(21) Appl. No.: 15/174,097

(22) Filed: Jun. 6, 2016

(65) Prior Publication Data

US 2016/0365608 A1     Dec. 15, 2016

(30) Foreign Application Priority Data

Jun. 11, 2015   (JP) .................. 2015-117954

(51) Int. Cl.
| | |
|---|---|
| H01M 10/44 | (2006.01) |
| H01M 10/0567 | (2010.01) |
| H01M 4/505 | (2010.01) |
| H01M 4/525 | (2010.01) |
| H01M 10/052 | (2010.01) |

(52) U.S. Cl.
CPC ..... *H01M 10/446* (2013.01); *H01M 10/0567* (2013.01); *H01M 4/505* (2013.01); *H01M 4/525* (2013.01); *H01M 10/052* (2013.01)

(58) Field of Classification Search
CPC .................................................. H01M 10/44
See application file for complete search history.

(56) References Cited

U.S. PATENT DOCUMENTS

2014/0255796 A1    9/2014   Matsuoka et al.

FOREIGN PATENT DOCUMENTS

| EP | 1156548 A2 | 11/2001 |
|---|---|---|
| JP | 1997-268405 | * 10/1997 |
| JP | 11-111267 A | 4/1999 |
| JP | 2001-325988 A | 11/2001 |
| JP | 2002-203609 A | 7/2002 |
| JP | 3899614 B2 | 3/2007 |
| JP | 2008-091259 A | 4/2008 |
| JP | 2010-198832 A | 9/2010 |
| WO | 2013/062056 A1 | 5/2013 |

* cited by examiner

*Primary Examiner* — Jacob Marks
(74) *Attorney, Agent, or Firm* — Sughrue Mion, PLLC (57) ABSTRACT

A method of manufacturing a nonaqueous electrolyte secondary battery includes: constructing a nonaqueous electrolyte secondary battery including an electrode body and an electrolytic solution, the electrode body including a negative electrode, and the electrolytic solution containing a nonaqueous solvent and a negative electrode film forming agent having a decomposition voltage that is lower than a decomposition voltage of the nonaqueous solvent; performing first charging of the nonaqueous electrolyte secondary battery at a voltage that is equal to or higher than the decomposition voltage of the negative electrode film forming agent and lower than the decomposition voltage of the nonaqueous solvent and at −30° C. to 0° C.; and performing second charging of the nonaqueous electrolyte secondary battery at a voltage that is equal to or higher than the decomposition voltage of the nonaqueous solvent and at a temperature of 25° C. or higher and lower than a boiling point of the electrolytic solution.

7 Claims, 5 Drawing Sheets

METHOD OF MANUFACTURING NONAQUEOUS ELECTROLYTE SECONDARY BATTERY

INCORPORATION BY REFERENCE

The disclosure of Japanese Patent Application No. 2015-117954 filed on Jun. 11, 2015 including the specification, drawings and abstract is incorporated herein by reference in its entirety.

BACKGROUND OF THE INVENTION

1. Field of the Invention

The present invention relates to a method of manufacturing a nonaqueous electrolyte secondary battery.

2. Description of Related Art

A nonaqueous electrolyte secondary battery such as a lithium ion secondary battery (lithium secondary battery) has a lighter weight and higher energy density than existing batteries. Therefore, recently, a nonaqueous electrolyte secondary battery has been used as a so-called portable power supply for a PC, a portable device, or the like or as a drive power supply for a vehicle. In particular, it is expected that a light-weight lithium ion secondary battery capable of obtaining a high energy density will be increasingly widely used as a high-output power supply for driving a vehicle such as an electric vehicle (EV), a hybrid vehicle (HV), or a plug-in hybrid vehicle (PHV).

During the manufacturing of a nonaqueous electrolyte secondary battery, initial charging is performed as a finishing step after a battery construction step. Due to this initial charging, a film (so-called solid electrolyte interface (SEI)) is formed on a negative electrode. This film can allow smooth intercalation and deintercalation of ions, which are charge carriers, and functions as a passive film which suppresses the reductive decomposition of an electrolytic solution.

In a nonaqueous electrolyte secondary battery, it is important to form a good film by initial charging from the viewpoint of retaining the battery capacity. Japanese Patent Application Publication No. 2008-91259 (JP 2008-91259 A) discloses a configuration of initially charging a nonaqueous electrolyte secondary battery, which contains a nonaqueous electrolytic solution containing vinylene carbonate as a negative electrode film forming agent, in an environment of −5° C. to 10° C. at a current value of 1.0 C or lower such that a good film is formed on a negative electrode to improve the capacity retention of the nonaqueous electrolyte secondary battery.

However, as a result of thorough investigation, the present inventors found that the initial resistance of a nonaqueous electrolyte secondary battery may increase only with the configuration of forming a film on a negative electrode using a negative electrode film forming agent as disclosed in JP 2008-91259 A.

SUMMARY OF THE INVENTION

Therefore, the invention provides a method capable of manufacturing a nonaqueous electrolyte secondary battery having a high capacity retention and a low initial resistance.

A method of manufacturing a nonaqueous electrolyte secondary battery disclosed herein includes: constructing a nonaqueous electrolyte secondary battery including an electrode body and an electrolytic solution, the electrode body including a negative electrode, and the electrolytic solution containing a nonaqueous solvent and a negative electrode film forming agent having a decomposition voltage that is lower than a decomposition voltage of the nonaqueous solvent; performing a first charging of the nonaqueous electrolyte secondary battery at a voltage that is equal to or higher than the decomposition voltage of the negative electrode film forming agent and lower than the decomposition voltage of the nonaqueous solvent and at −30° C. to 0° C.; and performing a second charging of the nonaqueous electrolyte secondary battery at a voltage that is equal to or higher than the decomposition voltage of the nonaqueous solvent and at a temperature of 25° C. or higher and lower than a boiling point of the electrolytic solution. According to the above-described configuration, a film derived from the negative electrode film forming agent (that is, an additive which forms a film on the negative electrode) is formed during the first charging, and a film derived from the nonaqueous solvent is formed during the second charging. As a result, two characteristics of the battery including high capacity retention and low initial resistance can be simultaneously realized.

According to one aspect of the method of manufacturing a nonaqueous electrolyte secondary battery disclosed herein, after the voltage reaches a value that is equal to or higher than the decomposition voltage of the negative electrode film forming agent and lower than the decomposition voltage of the nonaqueous solvent, the voltage may be retained in a range that is equal to or higher than the decomposition voltage of the negative electrode film forming agent and lower than the decomposition voltage of the nonaqueous solvent for 3 hours or longer. According to the above-described configuration, the capacity retention of the battery is particularly high.

According to one aspect of the method of manufacturing a nonaqueous electrolyte secondary battery disclosed herein, after the voltage reaches a value that is equal to or higher than the decomposition voltage of the negative electrode film forming agent and lower than the decomposition voltage of the nonaqueous solvent, the voltage at a temperature of −30° C. to 0° C. may be retained in a range that is equal to or higher than the decomposition voltage of the negative electrode film forming agent and lower than the decomposition voltage of the nonaqueous solvent for 1 hour or longer. According to the above-described configuration, the capacity retention of the battery is particularly high.

According to one aspect of the method of manufacturing a nonaqueous electrolyte secondary battery disclosed herein, a charging rate at which the voltage is increased to a value that is equal to or higher than the decomposition voltage of the negative electrode film forming agent and lower than the decomposition voltage of the nonaqueous solvent may be 10 mV/sec or lower. According to the above-described configuration, the capacity retention of the battery is particularly high.

According to one aspect of the method of manufacturing a nonaqueous electrolyte secondary battery disclosed herein, the negative electrode film forming agent may be vinylene carbonate or a lithium salt containing an oxalato complex as an anion. According to the above-described configuration, a particularly good film can be formed on the negative electrode.

According to one aspect of the method of manufacturing a nonaqueous electrolyte secondary battery disclosed herein, a temperature during the second charging may be 25° C. to 35° C. According to the above-described configuration, since the method can be performed in a normal temperature range, it is easy to perform the method.

According to one aspect of the method of manufacturing a nonaqueous electrolyte secondary battery disclosed herein, a charging rate during the second charging may be higher than a charging rate during the first charging. According to the above-described configuration, the second charging is performed in a temperature range in which lithium metal is not likely to be deposited on the negative electrode. Therefore, by increasing the charging rate during the second charging, the total charging time can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the drawings. Matters (for example, general configurations of a battery and a process of manufacturing the same which are not characteristics of the invention) necessary to practice this invention other than those specifically referred to in this specification may be understood as design matters based on the related art in the pertinent field for a person of ordinary skill in the art. The invention can be practiced based on the contents disclosed in this specification and common technical knowledge in the subject field. In addition, parts or portions having the same function are represented by the same reference numerals. In each drawing, a dimensional relationship (for example, length, width, or thickness) does not reflect the actual dimensional relationship.

"Secondary battery" described in this specification refers to general storage devices which can be repeatedly charged and discharged and is a collective term for storage elements including so-called storage batteries such as a lithium ion secondary battery and electric double layer capacitors. In addition, "nonaqueous electrolyte secondary battery" refers to batteries including a nonaqueous electrolyte (typically, a nonaqueous electrolytic solution containing a supporting electrolyte in a nonaqueous solvent). Hereinafter, the invention will be described in detail using a flat square lithium ion secondary battery as an example of a nonaqueous electrolyte secondary battery. However, the invention is not intended to be limited to the embodiment.

In the embodiment, a step of constructing a nonaqueous electrolyte secondary battery (lithium ion secondary battery 100) including an electrode body which includes a negative electrode, a nonaqueous solvent, and an electrolytic solution which contains a negative electrode film forming agent having a decomposition voltage that is lower than a decomposition voltage of the nonaqueous solvent; and two charging steps (first charging step and second charging step) are performed. First, the construction step will be described.

Figure 1:
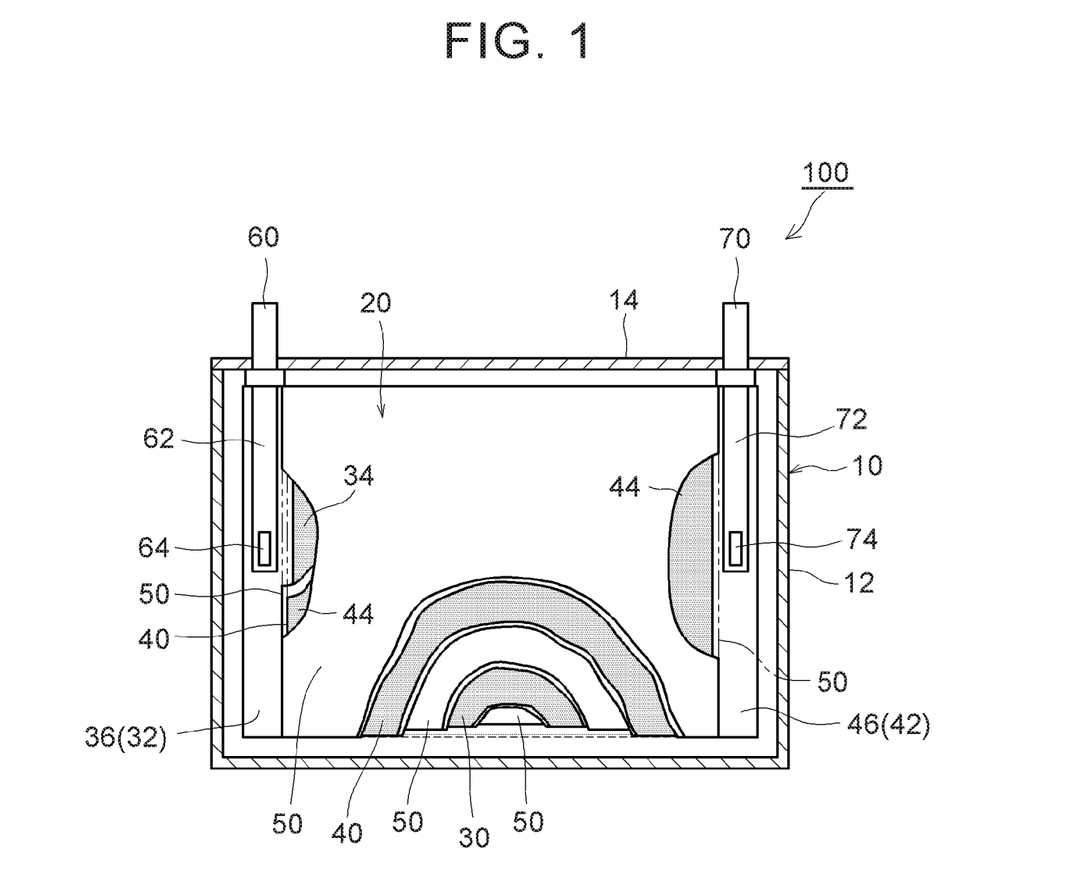
FIG. 1 is a sectional view schematically showing a configuration of a secondary battery manufactured according to an embodiment of the invention.

In the construction step, the lithium ion secondary battery 100 shown in FIG. 1 is constructed in which a flat wound electrode body 20 and an electrolytic solution (not shown) are accommodated in a flat square battery case (that is, an external case) 10. Specifically, first, the wound electrode body 20 is manufactured by arranging a positive electrode 30 and a negative electrode 40 to face each other with separators 50 interposed therebetween. Next, the wound electrode body 20 is accommodated in the battery case 10, this battery case 10 is sealed, and the electrolytic solution is injected into the battery case 10.

Figure 2:
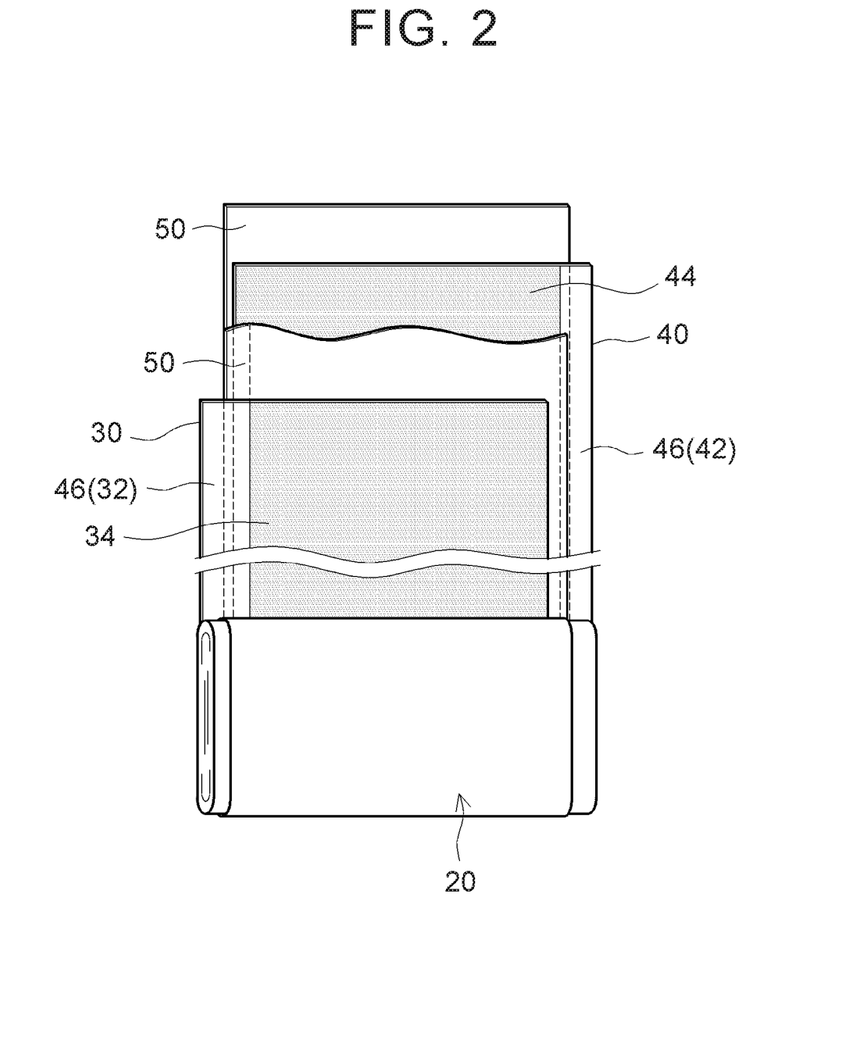
FIG. 2 is a schematic diagram showing a configuration of a wound electrode body of the secondary battery manufactured according to the embodiment.

A method of manufacturing the electrode body 20 will be described in detail. In order to manufacture the wound electrode body 20, the elongated sheet-shaped positive electrode 30, the elongated sheet-shaped negative electrode 40, and the elongated sheet-shaped two separators 50 are used. First, the above-described components are prepared.

Typically, the positive electrode 30 includes: a positive electrode current collector 32; and a positive electrode active material layer 34 that is formed on the positive electrode current collector 32 and contains at least a positive electrode active material. A method of preparing the positive electrode 30 is not particularly limited. For example, the positive electrode can be prepared using a method including: preparing a paste composition (including a slurry composition and an ink composition; hereinafter referred to as "positive electrode paste") by mixing a positive electrode active material, a conductive material, a binder, and the like with each other in an appropriate solvent; applying the paste to a single surface or both surfaces of the positive electrode current collector 32; and drying the paste. By appropriately pressing the positive electrode 30 after drying, the thickness and density of the positive electrode active material layer 34 can be adjusted.

As the positive electrode current collector 32, a conductive member formed of highly conductive metal (for example, aluminum, nickel, titanium, or stainless steel) is preferably used. The shape of the positive electrode current collector 32 is not particularly limited because it may vary depending on the shape of a battery to be constructed. For example, the positive electrode current collector 32 may have a rod shape, a plate shape, a foil shape, or a net shape. In the embodiment, a foil shape is used. The thickness of the foil-shaped current collector is not particularly limited, but is preferably 5 μm to 50 μm (more preferably 10 μtm to 30 μm) from the viewpoint of obtaining a good balance between the energy density of the battery and the strength of the current collector.

As the positive electrode active material, one material or two or more materials selected from among materials which are used for a secondary battery in the related art may be used without any particular limitation. Examples of the positive electrode active material include oxides (lithium transition metal oxides) containing a lithium atom and a transition metal atom as constituent metal atoms, and phosphates containing a lithium atom and a transition metal atom as constituent metal atoms. Among these, a lithium nickel cobalt manganese composite oxide having a layered structure (for example, $LiNi_{1/3}Co_{1/3}Mn_{1/3}O_2$) or a positive electrode active material containing $LiNi_{0.5}Mn_{1.5}O_4$ having a spinel structure as a major component is preferably used from the viewpoints of obtaining high energy density and superior thermal stability. A ratio of the mass of the positive electrode active material to the total mass of the positive electrode active material layer 34 is not particularly limited but is preferably about 50 mass % or higher (typically, 70 mass % or higher; for example, 80 mass % or higher).

As the conductive material, one material or two or more materials selected from among materials which are used for a secondary battery in the related art may be used without any particular limitation. For example, a carbon material such as carbon black, coke, or graphite can be used. Among these, carbon black having a small particle size and a large specific surface area (typically, acetylene black) can be preferably used. A ratio of the mass of the conductive material to the total mass of the positive electrode active material layer is not particularly limited but is, for example, 1 mass % to 15 mass % (typically, 5 mass % to 10 mass %).

The binder is not particularly limited, but one material or two or more materials selected from among materials which are used for a secondary battery in the related art may be used. In a case where the positive electrode active material layer is formed using a nonaqueous paste, a polymer material which can be dissolved or dispersed in a nonaqueous solvent can be preferably adopted. Examples of the polymer material include polyvinylidene fluoride (PVdF), polyvinylidene chloride (PVdC), and polyethylene oxide. In a case where the positive electrode active material layer is formed using an aqueous paste, a polymer material which can be dissolved or dispersed in water can be adopted. Examples of the polymer material include polytetrafluoroethylene (PTFE), carboxymethyl cellulose (CMC), and styrene-butadiene rubber (SBR). A ratio of the mass of the binder to the total mass of the positive electrode active material layer is not particularly limited but is, for example, 0.5 mass % to 10 mass % (preferably, 1 mass % to 2 mass %).

As the solvent, one solvent or two or more solvents selected from among solvents which are used for a secondary battery in the related art may be used without any particular limitation. These solvents are roughly classified into an aqueous solvent and a nonaqueous solvent. The aqueous solvent is not particularly limited as long as it is aqueous as a whole, and water or a mixed solvent containing water as a major component can be preferably used. Preferable examples of the nonaqueous solvent include N-methyl-2-pyrrolidone (NMP), methyl ethyl ketone, and toluene.

Various additives, which can be used for a secondary battery in the related art, such as a dispersant or a thickener can be added to the positive electrode paste within a range where the effects of the invention do not significantly deteriorate.

The amount of the positive electrode active material layer 34 (when the positive electrode active material layer 34 is formed on both surfaces of the positive electrode current collector 32, the total amount thereof provided on the surfaces) provided per unit area of the positive electrode current collector 32 is not particularly limited but is, for example, about 5 mg/cm² to 100 mg/cm². The density of the positive electrode active material layer 34 is, for example, 2.0 g/cm³ or higher (typically 2.5 g/cm³ or higher) and is, for example, 4.5 g/cm³ or lower (typically 4.2 g/cm³ or lower).

Typically, the negative electrode 40 includes: a negative electrode current collector 42; and a negative electrode active material layer 44 that is formed on the negative electrode current collector 42 and contains at least a negative electrode active material. A method of preparing the negative electrode is not particularly limited. For example, the negative electrode can be prepared using a method including: preparing a paste composition (hereinafter referred to as "negative electrode paste") by mixing a negative electrode active material, a binder, and the like with each other in an appropriate solvent; applying the paste to a single surface or both surfaces of the negative electrode current collector 42; and drying the paste. By appropriately pressing the negative electrode 40 after drying, the thickness and density of the negative electrode active material layer 44 can be adjusted.

As the negative electrode current collector 42, a conductive member formed of highly conductive metal (for example, copper, nickel, titanium, or stainless steel) is preferably used. The negative electrode current collector 42 may have the same shape as that of the positive electrode current collector 32.

As the negative electrode active material, one material or two or more materials selected from among materials which are used for a secondary battery in the related art may be used without any particular limitation. Examples of the negative electrode active material include graphite such as natural graphite (plumbago) and a modified product or artificial graphite produced from a petroleum-based or coal-based material; a carbon material (having low crystallinity) containing at least partially a graphite structure (layered structure), such as hard carbon (non-graphitizable carbon), soft carbon (graphitizable carbon), or carbon nanotube; a metal oxide such as lithium titanium composite oxide; and an alloy of lithium and tin (Sn) or silicon (Si). A ratio of the mass of the negative electrode active material to the total mass of the negative electrode active material layer 44 is not particularly limited, but is suitably about 50 mass % or higher and is preferably about 90 mass % or higher (for example, 95 mass % or higher).

The binder can be appropriately selected from the exemplary polymer materials described above as the binder for the positive electrode active material layer 34. A ratio of the mass of the binder to the total mass of the negative electrode active material layer 44 is not particularly limited, but is, for example, 1 mass % to 10 mass % (preferably, 2 mass % to 5 mass %).

Depending on the method of forming the negative electrode active material layer 44, a thickener may be added. As the thickener, the same binders as described above may be used. For example, the following water-soluble or water-dispersible polymer may be adopted. Examples of the water-soluble polymer include cellulose polymers such as methyl cellulose (MC) or carboxymethyl cellulose (CMC); and polyvinyl alcohol (PVA).

The amount of the negative electrode active material layer 44 (the total amount thereof provided on both the surfaces) provided per unit area of the negative electrode current collector 42 is not particularly limited but is, for example, about 2.5 mg/cm² to 50 mg/cm². The density of the negative electrode active material layer 44 is, for example, 1.1 g/cm³ or higher (typically 1.2 g/cm³ or higher; for example 1.3 g/cm³ or higher) and is, for example, 1.5 g/cm³ or lower (typically 1.49 g/cm³ or lower).

As the separator 50, various microporous sheets which are used for a secondary battery in the related art can be used, and examples thereof include a microporous resin sheet formed of a resin such as polyethylene (PE) or polypropylene (PP). The microporous resin sheet may have a single-layer structure or a multilayer structure including two or more layers (for example, a three-layer structure in which a PP layer is laminated on both surfaces of a PE layer). The separator 50 may include a heat resistance layer (HRL) containing inorganic compound particles (inorganic filler) that is formed on a single surface or both surfaces of the microporous resin sheet. As the inorganic filler, for example, alumina, boehmite, or magnesia can be adopted.

As shown in FIG. 2, typically, the positive electrode 30 includes a portion 36 where the positive electrode active material layer 34 is not provided at one end portion of the positive electrode 30 in the longitudinal direction to expose the positive electrode current collector 32 therefrom. Likewise, for example, the negative electrode 40 includes a portion 46 where the negative electrode active material layer 44 is not provided at one end portion of the negative electrode 40 in the longitudinal direction to expose the negative electrode current collector 42 therefrom. The electrode body 20 having a high current collecting efficiency can be formed using a method including: laminating the exposure portions 36, 46 of the positive and negative electrodes so as to be aligned at one of the end portions; and intensively collecting the current from the exposure portions 36, 46. The flat wound electrode body 20 may be prepared using a method including: laminating the elongated positive electrode 30 and the negative electrode 40 in the insulating state with the two separators 50 interposed therebetween; winding the laminate in the longitudinal direction; squashing the wound body from the side surface thereof. The laminate itself may be prepared to be wound such that the wound section has a flat shape. In the embodiment, the wound electrode body 20 is adopted as an electrode body. However, as the electrode body, a flat laminated electrode body in which plural sheets of the positive electrode, the negative electrode, and the separators are laminated may be adopted.

Next, the electrode body 20 is appropriately accommodated in the battery case 10. Regarding the battery case 10, a material and a shape used for a secondary battery in the related art can be adopted. As the material of the battery case 10, for example, a relatively light-weight metal material such as aluminum or steel; a resin material such as a polyimide resin can be used.

The battery case 10 shown in FIG. 1 includes: a flat cuboid-shaped (square shape) case body 12 having an opening at an upper end; and a sealing lid 14 that covers the opening. In a top surface (that is, the sealing lid 14) of the battery case 10, a positive electrode terminal 60, which is electrically connected to the positive electrode 30 of the wound electrode body 20, and a negative electrode terminal 70, which is electrically connected to the negative electrode 40 of the wound electrode body 20, are provided. For example, in the electrode body 20, a positive electrode current collector plate 62 is attached to an exposure end portion of the positive electrode current collector 32 through a welding portion 64, and a negative electrode current collector plate 72 is attached to an exposure end portion of the negative electrode current collector 42 through a welding portion 74. As a result, the positive and negative electrode current collector plates 62, 72 are electrically connected to the positive electrode terminal 60 and the negative electrode terminal 70, respectively. In the battery case 10, optionally, a safety device such as a current interrupt device (device capable of interrupting the current in response to an increase in inner pressure when a battery is overcharged) may be provided on a conductive path between the positive electrode terminal 60 and the negative electrode terminal 70, and the electrode body 20. Further, as in the case of the battery case 10 of a secondary battery of the related art, the sealing lid 14 may further include a safety valve (not shown) for discharging gas, produced from the inside of the battery case 10, to the outside of the battery case 10. The sealing lid 14 includes an electrolytic solution injection hole (not shown).

Next, the case 10 is sealed, and the electrolytic solution is injected into the case 10. The sealing operation can be performed using the same method as that used for a secondary battery in the related art. For example, when the battery case 10 is formed of metal, a method such as laser welding, resistance welding, or electron beam welding can be used. In addition, when the battery case 10 is formed of a non-metal material (for example, a resin material), a method such as bonding with an adhesive or ultrasonic welding can be used.

As the electrolytic solution, an electrolytic solution, which contains a nonaqueous solvent and a negative electrode film forming agent having a decomposition voltage that is lower than a decomposition voltage of the nonaqueous solvent, is used. The electrolytic solution contains a supporting electrolyte (typically a lithium salt).

As the nonaqueous solvent, aprotic solvents such as carbonates, esters, ethers, nitriles, sulfones, and lactones can be used. Among these, carbonates such as ethylene carbonate (EC), diethyl carbonate (DEC), dimethyl carbonate (DMC), and ethyl methyl carbonate (EMC) can be preferably adopted. From the viewpoint of the decomposition voltage, it is more preferable that the nonaqueous solvent contains ethylene carbonate.

Examples of the negative electrode film forming agent which can be used include: a carbonate compound such as vinylene carbonate (VC), vinyl ethylene carbonate (VEC), fluoroethylene carbonate (FEC), chloroethylene carbonate, or methylphenyl carbonate; a lithium salt containing an oxalato complex as an anion such as lithium bis(oxalato) borate (LiBOB), lithium difluoro(oxalato)borate (LiFOB), or lithium difluorobis(oxalato)phosphate (LPFO); an alkene sulfide such as ethylene sulfide or propylene sulfide; a sultone compound such as 1,3-propane sultone or 1,4-butane sultone; and an acid anhydride such as maleic anhydride or succinic anhydride. Among these, a carbonate compound or a lithium salt containing an oxalato complex as an anion is preferable from the viewpoint of obtaining a good film. VC or a lithium salt containing an oxalato complex as an anion (in particular, LiBOB or LPFO) is more preferable. The concentration of the negative electrode film forming agent is preferably 0.1 mass % to 2 mass % with respect to the total mass of the nonaqueous electrolyte but is not limited thereto.

As the supporting electrolyte, various known materials which can function as a supporting electrolyte of a secondary battery can be appropriately adopted. For example, one material or two or more materials selected from various lithium salts such as $LiPF_6$, $LiBF_4$, $LiClO_4$, $LiN(SO_2CF_3)_2$, $LiN(SO_2C_2F_5)_2$, $LiCF_3SO_3$, $LiC_4F_9SO_3$, and $LiC(SO_2CF_3)_3$ can be used. Among these, $LiPF_6$ can be preferably used. The concentration of the supporting electrolyte in the nonaqueous electrolyte is not particularly limited but is, for example, 0.1 mol/L to 2 mol/L and preferably about 0.8 mol/L to 1.5 mol/L.

In order to further improve the characteristics of the nonaqueous electrolyte secondary battery, the nonaqueous electrolyte may further contain additives such as an overcharge additive, a surfactant, a dispersant, or a thickener.

Next, the charging steps will be described. The charging steps include the first charging step and the second charging step. In the first charging step, the lithium ion secondary battery 100 is charged at a voltage that is equal to or higher than the decomposition voltage of the negative electrode film forming agent and lower than the decomposition voltage of the nonaqueous solvent and at −30° C. to 0° C. Through the first charging step, the negative electrode film forming agent is electrically decomposed to form a film, which is derived from the negative electrode film forming agent, on the negative electrode.

Figure 4:
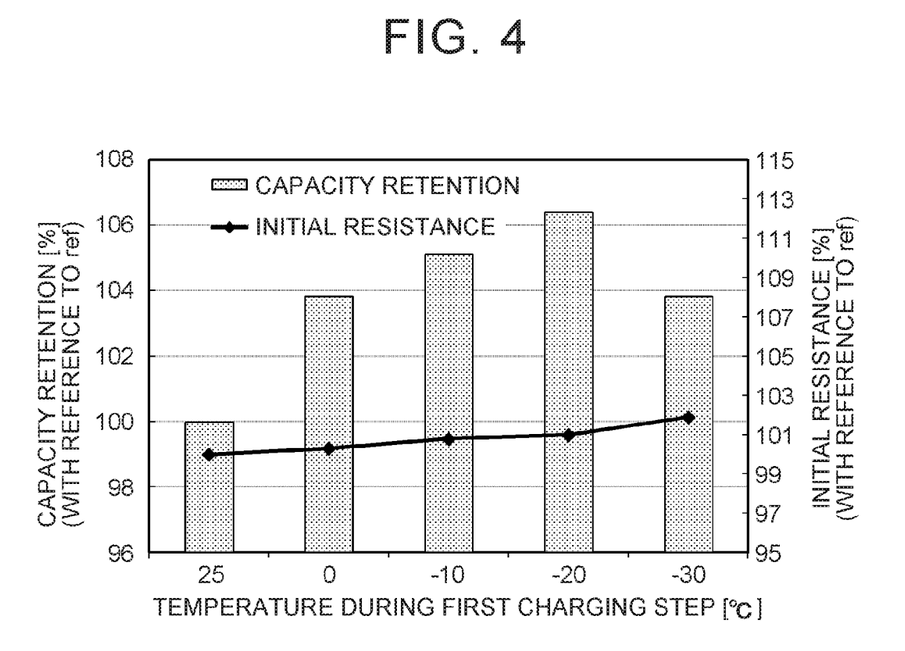
FIG. 4 is a graph showing the results of evaluating the capacity retention and the initial resistance regarding examples in which a temperature in a first charging step was changed in Experiment 2.

The temperature during the charging is −30° C. to 0° C. As the temperature decreases, the volume of the nonaqueous solvent decreases. Accordingly, the volume of the electrolytic solution at a low temperature of −30° C. to 0° C. is lower than that at normal temperature. Therefore, a ratio of the volume of the electrolytic solution, which is impregnated into the wound electrode body 20, to the total volume of the electrolytic solution at a low temperature of −30° C. to 0° C. is higher than that at normal temperature. That is, the proportion of the amount of the negative electrode film forming agent in the wound electrode body 20 at a low temperature of −30° C. to 0° C. is higher than that at normal temperature. Accordingly, when the charging is performed at the above-described low temperature, a film derived from the negative electrode film forming agent can be efficiently formed on the negative electrode. As a result, as shown in FIG. 4, the capacity retention of the battery at a low temperature of −30° C. to 0° C. is higher than that at normal temperature. From the viewpoint of further increasing the capacity retention, the temperature during the charging is preferably −5° C. to −25° C., more preferably −10° C. to −23° C., and still more preferably −15° C. to −22° C.

Figure 5:
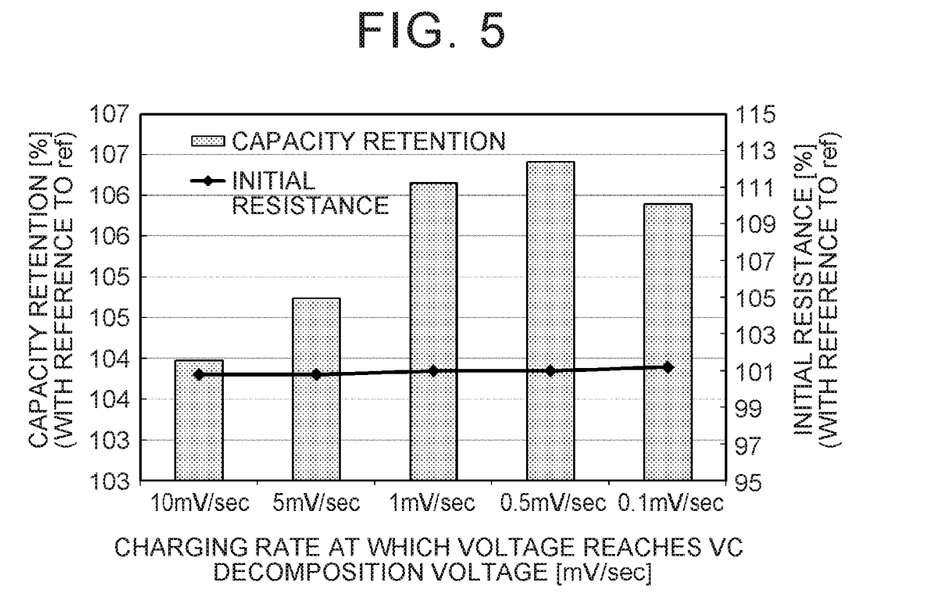
FIG. 5 is a graph showing the results of evaluating the capacity retention and the initial resistance regarding examples in which a charging rate was changed in Experiment 3.

In the first charging step, it is preferable that a charging rate at which the voltage is increased to a value that is equal to or higher than the decomposition voltage of the negative electrode film forming agent and lower than the decomposition voltage of the nonaqueous solvent is 10 mV/sec or lower. As shown in FIG. 5, by increasing the voltage at the above-described charging rate, the capacity retention of the lithium ion secondary battery 100 can be further increased. From the viewpoint of further increasing the capacity retention, the charging rate is more preferably 0.05 mV/sec to 5 mV/sec and still more preferably 0.1 mV/sec to 1 mV/sec.

In the first charging step, when the voltage reaches a value that is equal to or higher than the decomposition voltage of the negative electrode film forming agent and lower than the decomposition voltage of the nonaqueous solvent, the film is rapidly formed on the negative electrode. However, it is preferable that, after the voltage reaches a value that is equal to or higher than the decomposition voltage of the negative electrode film forming agent and lower than the decomposition voltage of the nonaqueous solvent, the voltage is retained in a range that is equal to or higher than the decomposition voltage of the negative electrode film forming agent and lower than the decomposition voltage of the nonaqueous solvent for a certain period of time. As a result, the negative electrode film forming agent, which is contained in the nonaqueous electrolytic solution outside the wound electrode body 20, moves into the wound electrode body 20 due to concentration diffusion, which can advance the formation of the film. The voltage may vary in the range that is equal to or higher than the decomposition voltage of the negative electrode film forming agent and lower than the decomposition voltage of the nonaqueous solvent, but is preferably retained at a certain value. The voltage retention time is preferably 3 hours or longer. During the retention of the voltage, the temperature may be changed from a temperature range of −30° C. to 0° C. in the first charging step to a temperature range of 25° C. or higher and lower than a boiling point of the electrolytic solution in the second charging step. Typically, this temperature change requires 3 hours. Therefore, as described above, the voltage retention time is preferably 3 hours or longer.

Figure 6:
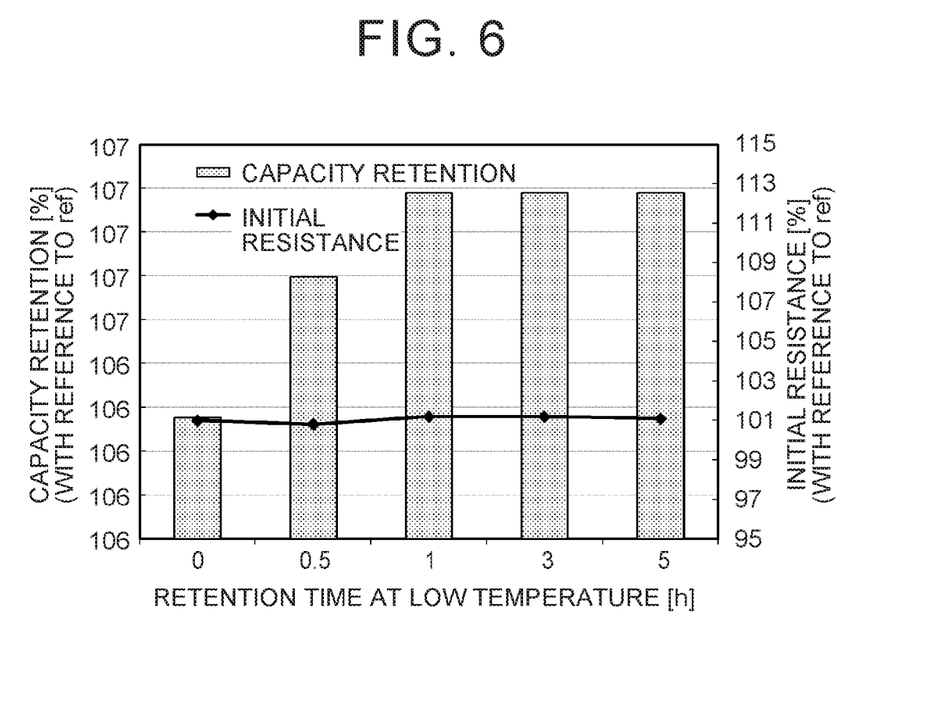
FIG. 6 is a graph showing the results of evaluating the capacity retention and the initial resistance regarding examples in which a voltage retention time at a low temperature was changed in Experiment 4.

It is preferable that, after the voltage reaches a value that is equal to or higher than the decomposition voltage of the negative electrode film forming agent and lower than the decomposition voltage of the nonaqueous solvent, the voltage at −30° C. to 0° C. is retained in a range that is equal to or higher than the decomposition voltage of the negative electrode film forming agent and lower than the decomposition voltage of the nonaqueous solvent for 1 hour or longer. The voltage may vary in the range that is equal to or higher than the decomposition voltage of the negative electrode film forming agent and lower than the decomposition voltage of the nonaqueous solvent, but is preferably retained at a certain value. As shown in FIG. 6, by leaving the lithium ion secondary battery 100 to stand in a temperature range of −30° C. to 0° C. for 1 hour or longer, the capacity retention of the battery can be further increased. The reason for this is presumed to be as follows. As the temperature decreases, the volume of the nonaqueous solvent decreases. Therefore, the formation of the film at a low temperature is more efficiently advanced than at normal temperature. However, it is not preferable that the temperature is lower than −30° C. because the diffusion rate of the negative electrode film forming agent excessively decreases. The temperature during the retention of the voltage is preferably −5° C. to −25° C., more preferably −10° C. to −23° C., and still more preferably −15° C. to −22° C.

After the first charging step, the temperature and voltage of the battery are increased for the second charging step. First, it is preferable that the temperature of the battery is increased to 25° C. or higher. When high-rate charging is performed at a low temperature, lithium metal is likely to be deposited on the negative electrode. In addition, the decomposability of the nonaqueous solvent is low at a low temperature. Accordingly, when the voltage is increased to the decomposition voltage of the nonaqueous solvent or higher after the temperature reaches 25° C. or higher, the charging can be performed at a high rate. The charging rate at which the voltage is increased to a value that is equal to or higher than the decomposition voltage of the nonaqueous solvent is preferably 0.57 mV/sec to 1.14 mV/sec but is not limited thereto.

In the second charging step, the nonaqueous electrolyte secondary battery is charged at a voltage that is equal to or higher than the decomposition voltage of the nonaqueous solvent and at a temperature of 25° C. or higher and lower than a boiling point of the electrolytic solution. Through the second charging step, the nonaqueous solvent is electrically decomposed to form a film, which is derived from the negative electrode, on the negative electrode.

As described above, the film derived from the negative electrode film forming agent is formed in the first charging step, and the film derived from the nonaqueous solvent is formed in the second charging step. As a result, two characteristics of the battery including high capacity retention and low initial resistance can be simultaneously realized.

In the second charging step, the charging is performed at a temperature of 25° C. or higher and lower than a boiling point of the electrolytic solution. In the above-described temperature range, the reactivity of the nonaqueous solvent is high, and high-rate charging can be performed. Therefore, the total charging time can be reduced. Since the charging can be performed in a normal temperature range, it is easy to perform the charging. Therefore, the temperature during the charging is preferably 25° C. to 35° C., more preferably 25° C. to 30° C., and most preferably 25° C. In this specification, "high-rate charging" refers to "charging at a charging rate of 1.14 mV/sec or higher".

It is preferable that the charging rate during the second charging step is higher than the charging rate during the first charging step. The second charging step is performed in a temperature range in which lithium metal is not likely to be deposited on the negative electrode. Therefore, by increasing the charging rate during the second charging step, the total charging time can be reduced.

In a preferable aspect of the embodiment, the voltage of the lithium ion secondary battery 100 at a temperature of −30° C. to 0° C. is increased to a range that is equal to or higher than the decomposition voltage of the negative electrode film forming agent and lower than the decomposition voltage of the nonaqueous solvent (for example, at a charging rate of 10 mV/sec or lower). After the voltage reaches the range that is equal to or higher than the decomposition voltage of the negative electrode film forming agent and lower than the decomposition voltage of the nonaqueous solvent, the voltage is retained at a fixed value for 3 hours or longer. During this period, the temperature is increased to 25° C. or higher. Next, the voltage is increased to the decomposition voltage of the nonaqueous solvent or higher in a range of 25° C. or higher and lower than a boiling point of the electrolytic solution.

In a more preferable aspect of the embodiment, the voltage of the lithium ion secondary battery 100 at −30° C. to 0° C. is increased to a range that is equal to or higher than the decomposition voltage of the negative electrode film forming agent and lower than the decomposition voltage of the nonaqueous solvent (for example, at a charging rate of 10 mV/sec or lower). After the voltage reaches the range that is equal to or higher than the decomposition voltage of the negative electrode film forming agent and lower than the decomposition voltage of the nonaqueous solvent, the voltage at −30° C. to 0° C. is retained at a fixed value for 1 hour or longer. Next, the voltage is retained at a fixed value for 3 hours or longer. During this period, the temperature is increased to 25° C. or higher. Next, the voltage is increased to the decomposition voltage of the nonaqueous solvent or higher in a range of 25° C. or higher and lower than a boiling point of the electrolytic solution.

The lithium ion secondary battery 100 which is obtained using the above-described manufacturing method can be used for various applications. Preferable examples of the applications include driving power supplies mounted in vehicles such as a plug-in hybrid vehicle (PHV), a hybrid vehicle (HV), and an electric vehicle (EV). The lithium ion secondary battery 100 may be used in the form of a battery pack in which, typically, plural lithium ion secondary batteries are connected to each other in series and/or in parallel.

Hereinafter, several Examples relating to the invention will be described, but the Examples according to the invention are not intended to limit the invention.

First, the procedure of preparing a battery for investigation will be described below.

[Preparation of Battery A for Investigation]

$LiNi_{1/3}/Co_{1/3}Mn_{1/3}O_2$ (LNCM) as a positive electrode active material; acetylene black (AB) as a conductive material; and polyvinylidene fluoride (PVdF) as a binder were put into a kneader such that the mass ratio (LNCM:AB:PVdF) of these materials was 90:8:2. The materials were kneaded while adjusting the viscosity using N-methylpyrrolidone (NMP) to prepare a positive electrode active material slurry. This slurry was applied to both surfaces of an aluminum foil (positive electrode current collector) having a thickness of 15 μm such that the coating weight per single surface was 30 mg/cm$^2$, was dried, and was pressed. As a result, a positive electrode sheet including a positive electrode active material layer that is formed on a positive electrode current collector was prepared. Next, graphite (C) as a negative electrode active material; styrene-butadiene rubber (SBR) as a binder; and carboxymethyl cellulose (CMC) as a dispersant were put into a kneader such that a mass ratio (C:SBR:CMC) of the materials was 98:1:1. The mixture was kneaded while adjusting the viscosity with ion exchange water. As a result, a negative electrode active material slurry was prepared. This slurry was applied to both surfaces of an elongated copper foil (negative electrode current collector) having a thickness of 10 μm such that the coating weight per single surface was 15 mg/cm$^2$, was dried, and was pressed. As a result, a negative electrode sheet including a negative electrode active material layer that is formed on a negative electrode current collector was prepared.

The positive electrode sheet and the negative electrode sheet prepared as described above were wound together with two separator sheets (here, laminates having a three-layer structure in which polypropylene (PP) was laminated on both surfaces of polyethylene (PE); thickness: 20 μm, porosity: 48%), and the wound body was formed into a flat shape to prepare an electrode body. Next, a positive electrode terminal and a negative electrode terminal were attached to a lid of a battery case, and these terminals were respectively welded to the positive electrode current collector and the negative electrode current collector which were exposed through end portions of the wound electrode body. The wound electrode body connected to the lid as described above was accommodated in the battery case through an opening thereof, and the opening and the lid were welded. A nonaqueous electrolytic solution was injected through an electrolytic solution injection hole provided on the lid. In order to prepare the nonaqueous electrolytic solution, a mixed solvent containing ethylene carbonate (EC), dimethyl carbonate (DMC), and ethyl methyl carbonate (EMC) at a volume ratio (EC:DMC:EMC) of 30:40:30 was prepared. Next, $LiPF_6$ as a supporting electrolyte was added to the mixed solvent such that a concentration thereof was 1.1 mol/L. Further, vinylene carbonate as a negative electrode film forming agent was added to the mixed solvent such that a concentration was 1.0 mass % with respect to the nonaqueous electrolytic solution.

[Preparation of Battery B for Investigation]

Battery B for investigation was prepared using the same method as in Battery A for investigation, except that LPFO was added as the negative electrode film forming agent instead of vinylene carbonate such that the concentration thereof was 1.0 mass % with respect to the nonaqueous electrolytic solution.

A method of evaluating the batteries which were initially charged in each experiment will be described below.

[Measurement of Initial Capacity (Rated Capacity)]

Regarding each of the initially charged batteries according to the examples, the rated capacity was measured at a temperature of 25° C. through the following steps 1 to 3 in a voltage range of 3.0 V to 4.1 V.

(Step 1)

The battery was discharged at a constant current at 0.38 mV/sec until the voltage reached 3.0 V. Next, the battery was discharged at a constant voltage for 2 hours, and then the operation was stopped for 10 minutes.

(Step 2)

The battery was charged at a constant current at 0.38 mV/sec until the voltage reached 4.1 V. Next, the battery was charged at a constant voltage until the charging rate reached 0.0114 mV/sec, and then the operation was stopped for 10 minutes.

(Step 3)

The battery was discharged at a constant current at 0.38 mV/sec until the voltage reached 3.0 V. Next, the battery was discharged at a constant voltage until the discharging rate reached 0.0114 mV/sec, and then the operation was stopped for 10 minutes.

The discharge capacity (CCCV discharge capacity) during discharging ranging from the constant current discharge to the constant voltage discharge in Step 3 was set as the initial capacity.

[Evaluation of Initial Resistance (IV Resistance)]

Next, the batteries were charged to SOC 20% at a constant current (CC) at a temperature of 25° C. Each of the batteries whose SOC was adjusted to 20% was discharged to 3 V at a constant current (CC) at a discharging rate of 11.4 mV/sec, and the voltage drop amount after 10 seconds from discharging was measured. The IV resistance (Ω) was calculated by dividing the measured voltage drop value (V) by the corresponding current value, and the average value thereof was set as the initial resistance. The initial resistance of the evaluation battery was evaluated by percentage (%) with reference to the initial resistance value (100%) of a reference (ref) battery.

[Evaluation of Capacity Retention after High-Temperature Storage]

Next, the batteries were charged to SOC 60% at a constant current (CC) at a temperature of 25° C. Each of the batteries whose SOC was adjusted to 60% was stored in a thermostatic chamber at a temperature of 75° C. for 7 days. After completion of the test, the battery was extracted from the thermostatic chamber, and the battery capacity was measured using the same method as that of the initial capacity in a temperature environment of 25° C. The measured value after the high-temperature storage was divided by the initial value to calculate a capacity retention (%). The capacity retention of the evaluation battery was evaluated by percentage (%) with reference to the capacity retention value (100%) of a reference (ref) battery.

Experiment 1

Investigation on Two Steps of Initial Charging

Figure 3:
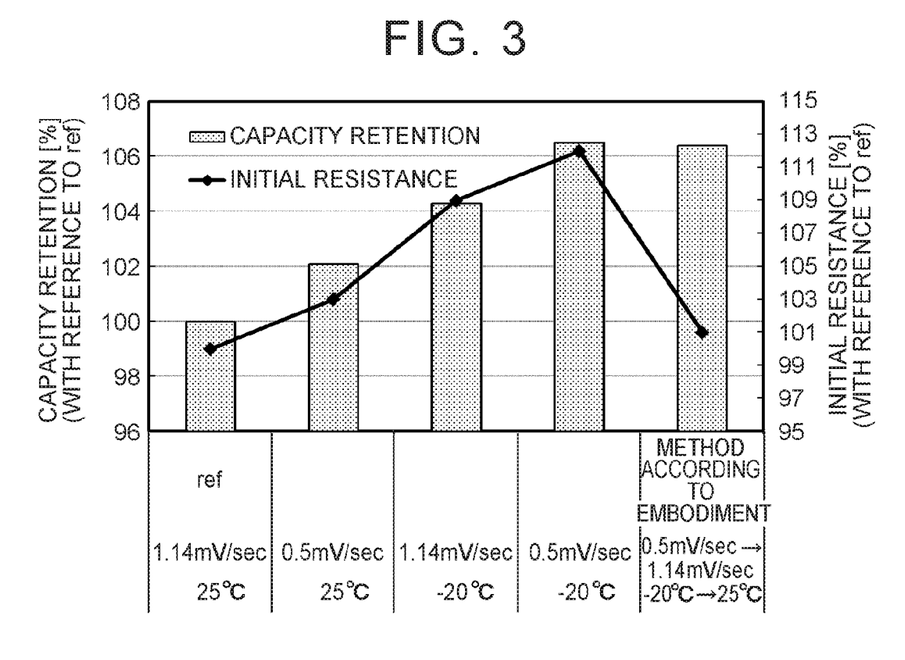
FIG. 3 is a graph showing the results of evaluating the capacity retention and the initial resistance regarding a battery of Example, which was manufactured according to the embodiment, and batteries of Comparative Examples in Experiment 1.

As the batteries, Batteries A for investigation were used. As the reference battery, Battery A for investigation was charged at 25° C. at a charging rate of 1.14 mV/sec. As a comparative battery, Battery A for investigation was charged at 25° C. at a charging rate of 0.5 mV/sec. As another comparative battery, Battery A for investigation was charged at −20° C. at a charging rate of 1.14 mV/sec. As still another comparative battery, Battery A for investigation was charged at −20° C. at a charging rate of 0.5 mV/sec. On the other hand, as the battery manufactured using the manufacturing method according to the embodiment (the method according to the embodiment), Battery A for investigation was charged at −20° C. at a charging rate of 0.5 mV/sec until the voltage reached 3.0 V higher than 2.8 V which is the decomposition voltage of vinylene carbonate as the negative electrode film forming agent (first charging step). The voltage was retained at 3.0 V for 3 hours. During this period, the internal temperature of the battery was increased to 25° C. Next, the battery was charged at 1.14 mV/sec, and the charging was continued until the voltage was the decomposition voltage of the nonaqueous solvent or higher (second charging step). Regarding these batteries, values (%) of the capacity retention and the initial resistance relative to the values of the reference battery were obtained. The results are shown in FIG. 3. It can be seen from FIG. 3 that the battery manufactured using the method according to the embodiment exhibited a high capacity retention and a low initial resistance.

Experiment 2

Investigation on Temperature in First Charging Step

As the batteries, Batteries A for investigation were used. As the reference battery, Battery A for investigation was charged at 25° C. at a charging rate of 5.7 mV/sec. On the other hand, as the battery manufactured using the manufacturing method according to the embodiment, Battery A for investigation was charged at 0° C., −10° C., −20° C., or −30° C. at a charging rate of 0.5 mV/sec until the voltage reached 3.0 V higher than 2.8 V which is the decomposition voltage of vinylene carbonate as the negative electrode film forming agent (first charging step). The voltage was retained at 3.0 V for 3 hours. During this period, the internal temperature of the battery was increased to 25° C. Next, the battery was charged at 1.14 mV/sec, and the charging was continued until the voltage was the decomposition voltage of the nonaqueous solvent or higher (second charging step). Regarding these batteries, values (%) of the capacity retention and the initial resistance relative to the values of the reference battery were obtained. The results are shown in FIG. 4. It can be seen from FIG. 4 that the battery on which the first charging step was performed at 0° C. to −30° C. exhibited a high capacity retention and a low initial resistance.

Experiment 3

Investigation on Charging Rate at which Voltage Reached Decomposition Voltage of Vinylene Carbonate As the batteries, Batteries A for investigation were used. As the reference battery, Battery A for investigation was charged at 25° C. at a charging rate of 5.7 mV/sec. On the other hand, as the battery manufactured using the manufacturing method according to the embodiment, Battery A for investigation was charged at −20° C. at a charging rate of 10 mV/sec, 5 mV/sec, 1 mV/sec, 0.5 mV/sec, or 0.1 mV/sec until the voltage reached 3.0 V higher than 2.8 V which is the decomposition voltage of vinylene carbonate as the negative electrode film forming agent (first charging step). The voltage was retained at 3.0 V for 3 hours. During this period, the internal temperature of the battery was increased to 25° C. Next, the battery was charged at 1.14 mV/sec, and the charging was continued until the voltage was the decomposition voltage of the nonaqueous solvent or higher (second charging step). Regarding these batteries, values (%) of the capacity retention and the initial resistance relative to the values of the reference battery were obtained. The results are shown in FIG. 5. It can be seen from FIG. 5 that the battery which was charged at a charging rate of 10 mV/sec exhibited a high capacity retention; and the battery which was charged at a charging rate of 0.1 mV/sec to 1 mV/sec exhibited a particularly high capacity retention.

Experiment 4

Investigation On Voltage Retention Time at Low Temperature

Battery A for investigation was used. As the reference battery, Battery A for investigation was charged at 25° C. at a charging rate of 1.14 mV/sec. On the other hand, as the battery manufactured using the manufacturing method according to the embodiment, Battery A for investigation was charged at −20° C. at a charging rate of 1 mV/sec until the voltage reached 3.0 V higher than 2.8 V which is the decomposition voltage of vinylene carbonate as the negative electrode film forming agent (first charging step). The voltage at −20° C. was retained at 3.0 V for 0 hours, 0.5 hours, 1 hour, 3 hours, or 5 hours. While retaining the voltage at 3.0 V, the internal temperature of the battery was increased to 25° C. for 3 hours. Next, the battery was charged at 1.14 mV/sec, and the charging was continued until the voltage was the decomposition voltage of the nonaqueous solvent or higher (second charging step). Regarding these batteries, values (%) of the capacity retention and the initial resistance relative to the values of the reference battery were obtained. The results are shown in FIG. 6. It can be seen from FIG. 6 that a high capacity retention can be obtained even without retaining the voltage at −20° C. at 3.0 V; however, in a case where the voltage at −20° C. is retained at 3.0 V for 1 hour or longer, the capacity retention is particularly high.

Experiment 5

Investigation on Kind of Negative Electrode Film Forming Agent

Figure 7:
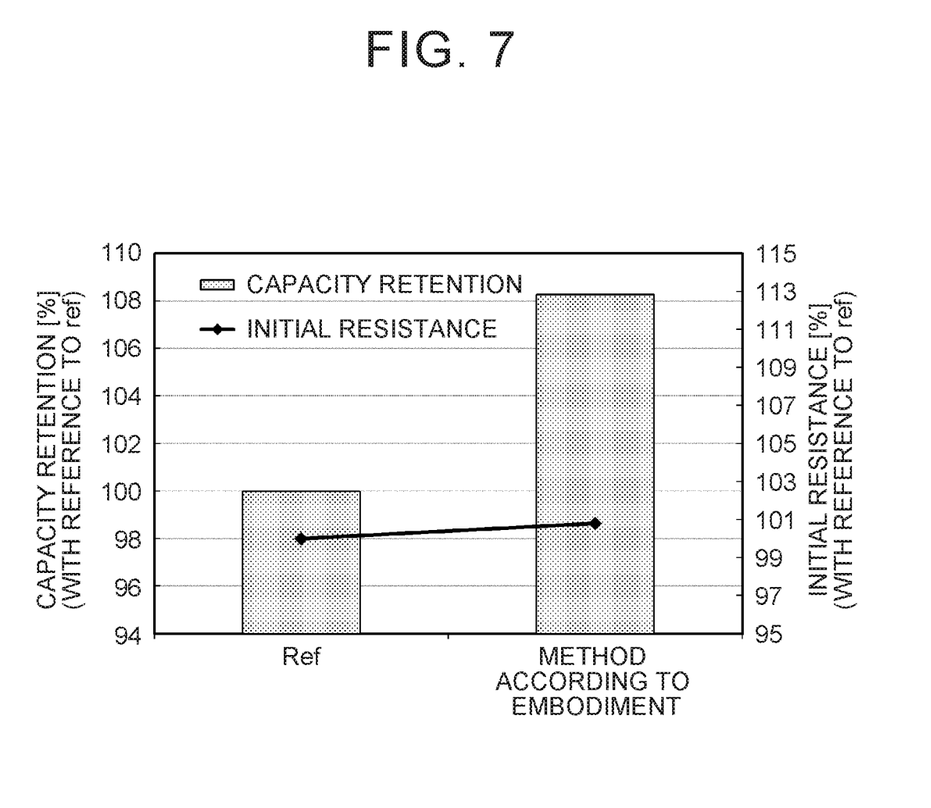
FIG. 7 is a graph showing the results of evaluating the capacity retention and the initial resistance regarding examples in which the kind of a negative electrode film forming agent was changed in Experiment 5.

As the reference battery, Battery A for investigation was charged at 25° C. at a charging rate of 5.7 mV/sec. As the battery manufactured using the manufacturing method according to the embodiment (the method according to the embodiment), Battery B for investigation was charged at −20° C. at a charging rate of 1 mV/sec until the voltage reached 2.3 V higher than 2.1 V which is the decomposition voltage of LPFO as the negative electrode film forming agent (first charging step). The voltage at −20° C. was retained at 2.3 V for 1 hour. While retaining the voltage at 2.3 V, the internal temperature of the battery was increased to 25° C. for 3 hours. Next, the battery was charged at 1.14 mV/sec, and the charging was continued until the voltage was the decomposition voltage of the nonaqueous solvent or higher (second charging step). Regarding these batteries, values (%) of the capacity retention and the initial resistance relative to the values of the reference battery were obtained. The results are shown in FIG. 7. It can be seen from FIG. 7 that, even when the kind of the negative electrode film forming agent was changed from vinylene carbonate to LPFO, the battery on which the first charging step and the second charging step were performed exhibited a high capacity retention and a low initial resistance.

Hereinabove, specific examples of the invention have been described in detail. However, these examples are merely exemplary and do not limit the claims. The technique described in the claims includes various modifications and alternations of the above-described specific examples.

What is claimed is:

1. A method of manufacturing a nonaqueous electrolyte secondary battery, the method comprising:
    constructing a nonaqueous electrolyte secondary battery including an electrode body and an electrolytic solution, the electrode body including a negative electrode, and the electrolytic solution containing a nonaqueous solvent and a negative electrode film forming agent having a decomposition voltage that is lower than a decomposition voltage of the nonaqueous solvent;
    performing a first charging of the nonaqueous electrolyte secondary battery at a voltage that is equal to or higher than the decomposition voltage of the negative electrode film forming agent and lower than the decomposition voltage of the nonaqueous solvent and at −30° C. to 0° C.; and
    performing a second charging of the nonaqueous electrolyte secondary battery at a voltage that is equal to or higher than the decomposition voltage of the nonaqueous solvent and at a temperature of 25° C. or higher and lower than a boiling point of the electrolytic solution.

2. The method according to claim 1, wherein
    after the voltage reaches a value that is equal to or higher than the decomposition voltage of the negative electrode film forming agent and lower than the decomposition voltage of the nonaqueous solvent, the voltage is retained in a range that is equal to or higher than the decomposition voltage of the negative electrode film forming agent and lower than the decomposition voltage of the nonaqueous solvent for 3 hours or longer.

3. The method according to claim 1, wherein
    after the voltage reaches a value that is equal to or higher than the decomposition voltage of the negative electrode film forming agent and lower than the decomposition voltage of the nonaqueous solvent, the voltage at a temperature of −30° C. to 0° C. is retained in a range that is equal to or higher than the decomposition voltage of the negative electrode film forming agent and lower than the decomposition voltage of the nonaqueous solvent for 1 hour or longer.

4. The method according to claim 1, wherein
    a charging rate at which the voltage is increased to a value that is equal to or higher than the decomposition voltage of the negative electrode film forming agent and lower than the decomposition voltage of the nonaqueous solvent is 10 mV/sec or lower.

5. The method according to claim 1, wherein
    the negative electrode film forming agent is vinylene carbonate or a lithium salt containing an oxalato complex as an anion.

6. The method according to claim 1, wherein
    a temperature during the second charging is 25° C. to 35° C.

7. The method according to claim 1, wherein
    a charging rate during the second charging is higher than a charging rate during the first charging.

* * * * *